United States Patent [19]

Haupt

[11] 3,895,679

[45] July 22, 1975

[54] FRICTION BLOCK FOR LEVER

[75] Inventor: Robert C. Haupt, Milwaukee, Wis.

[73] Assignee: Allis-Chalmers Corporation, Milwaukee, Wis.

[22] Filed: Oct. 26, 1973

[21] Appl. No.: 410,186

Related U.S. Application Data

[62] Division of Ser. No. 320,293, Jan. 2, 1973, Pat. No. 3,789,694.

[52] U.S. Cl. .................................................. 172/9
[51] Int. Cl. ........................................ A01b 63/112
[58] Field of Search ............... 172/9.7; 74/531, 491; 248/414

[56] References Cited

UNITED STATES PATENTS

| 3,194,319 | 7/1965 | Faure | 172/9 |
| 3,789,694 | 2/1974 | Haupt | 74/531 |

*Primary Examiner*—Stephen C. Pellegrino
*Attorney, Agent, or Firm*—Arthur L. Nelson

[57] ABSTRACT

A friction lock on a quadrant lever for providing heavy frictional resistance to pivotal movement in the first direction and light frictional resistance to pivotal movement in the second direction.

10 Claims, 6 Drawing Figures

FRICTION BLOCK FOR LEVER

This is a divisional application of my application Ser. Number 320,293, filed Jan. 2, 1973, now U.S. Pat. No. 3,789,694.

This invention relates to a lever mechanism and more particularly to a friction lock on a lever providing a low friction load on the lever when pivoted in one direction and a high friction load on the lever when pivoted in the other direction.

A lever used to control a mechanical linkage usually has a locking arrangement to retain the lever in a predetermined pivotal relationship relative to its pivotal supporting means. Such a locking arrangement may be in the form of a ratchet to set the lever in its desired position and retain it in its position against a biasing force of the mechanism attached to the lever. The ratchet locks the lever against the counter rotating force applied to the lever and holds the mechanism in this preset position. Although ratchets are quite satisfactory in many instances, it is often desirable to have an adjustment for positioning the lever in one of an infinite number of positions and be able to return the lever to any previous position without releasing the ratchet. Accordingly, a friction stop connected to the lever for retaining it in its preset position is often desirable. Accordingly, this invention provides a friction block to the lock lever by producing a strong friction load preventing the lever from movement in one direction and yet permitting the release of the friction block allowing the lever to move in the opposite direction under very low frictional load.

It is an object of this invention to provide a friction device for a lever providing low friction load in one direction and high friction load in the other direction of rotational movement.

It is another object of this invention to provide an adjustable friction loading device on a lever for producing high friction loading in one direction and low friction loading in the other direction of pivotal movement of a lever.

It is a further object of this invention to provide a lever having a friction lock controlling a load from a mechanism whereby the friction lock is released when the lever is moved against the load from the mechanism and the handle force required by the operator is reduced.

It is a further object of this invention to provide an adjustable friction device including a friction block pivotally supported on a pivotal mounting means for a lever. The friction block carries friction material which is pressed against the lever to retard the lever's movement in one direction and pivots away from the lever to release the lever and allowing substantial freedom of movement of the lever in the other pivotal direction.

The objects of this invention are accomplished by mounting a lever on a supporting means for pivotal rotation in either of two directions. The pivotal supporting means also carries a pivotal friction block, which is biased to a frictionally engaging position with the lever when the lever is rotated in one direction. The friction block carries friction material on one facing which engages a mating facing on the lever. As the lever is rotated in the one direction the friction material operates as a self-energizing braking structure to retard further movement of the lever. The friction block movably engages one side of the lever while a reaction plate is positioned on the opposite side of the lever and is adjustably biased for engagement on the opposite side of the lever. If additional force is applied on the lever, it is however possible to move the lever against the strong retarding force and the braking action of the friction block.

As the lever is moved in the opposite direction the friction block pivots away from the lever creating a low friction load on the lever, thereby permitting pivotal movement with relative ease in the other direction with respect to its initial movement in the first direction. The friction device provides infinite positioning of the lever in its rotational movement, as well as providing a friction lock for the lever when operating in the first direction.

The preferred embodiment of this invention is illustrated in the attached drawings.

Figure 1:
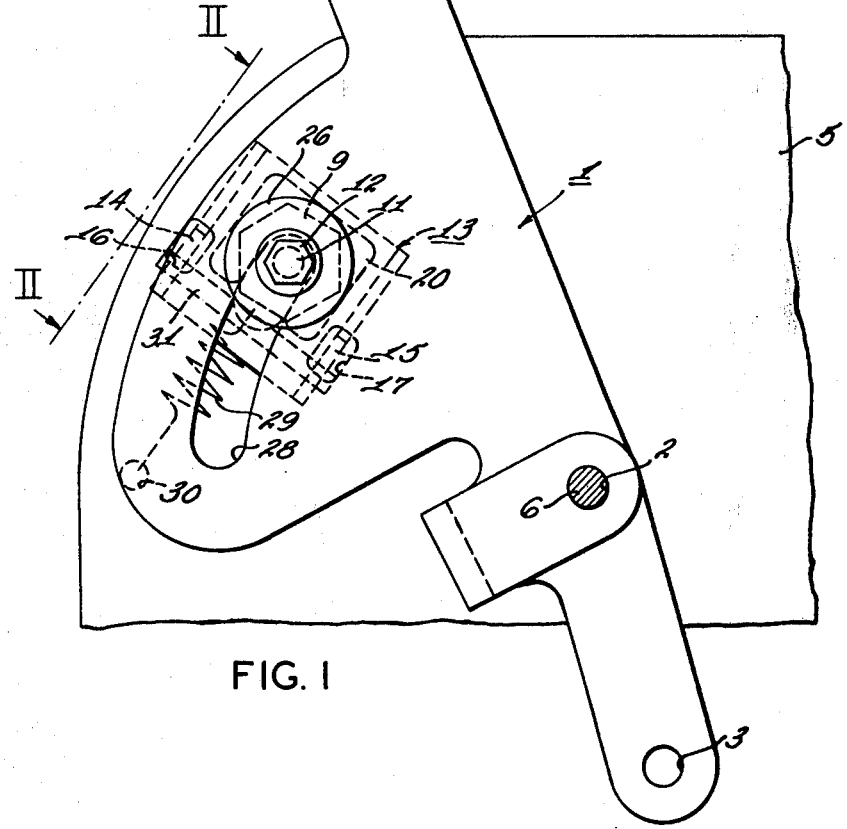
FIG. 1 illustrates a side elevation view of the lever.

Referring to the drawings, FIG. 1 illustrates a side elevation view of the lever 1 forming an opening 2. The opening 3 is adapted for connection to a pin of a suitable linkage. The handle 4 provides a means of operating the lever. The base 5 supports a shaft 6 which pivotally supports the lever 1. The base 5 also supports the stud bolt 7 which is fastened by nuts 8 and 9. The stud bolt 7 forms an intermediate portion 10 and a threaded portion 11 threadedly engaging the nut 12 to adjust the force of spring 23.

The friction block 13 pivots on the seats 14 and 15, which are aligned in the slots 16 and 17. The friction block 13 forms a surface 19 on which is bonded a friction material 20. The friction material 20 forms a braking surface, 21 engaging a surface 22 of a lever 1. As the nut 12 is tightened on the stud bolt 7, the spring 23 is compressed between the sleeve 24 and the undersurface 25 of the nut 12. The sleeve 24 seats on the reaction plate 26 which engages the surface 27 of the lever 1. The bolt 7 extends through the slot 28 formed in the lever 1. The slot 28 is arcuate about the center of the supporting shaft 6.

The return spring 29 is connected through the opening 30 in the base 5 and connects to a pin 31 positioned in the friction block 13. The spring returns the friction block 13 to the position shown when the lever is at rest.

Figure 3:
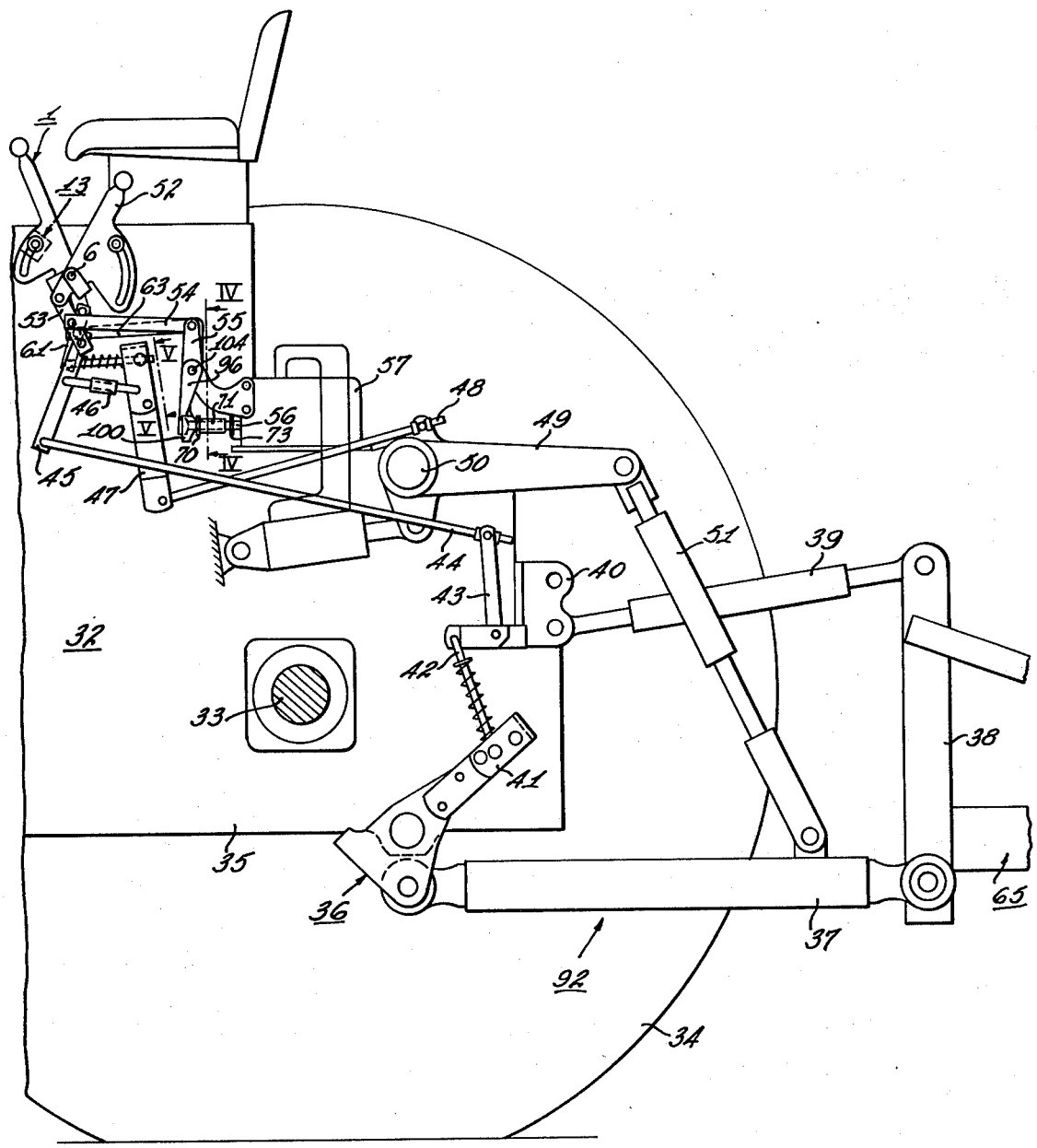
FIG. 3 illustrates a draft load sensing mechanism and a position control mechanism on a draft vehicle in which this lever adapts itself well.
Figure 5:
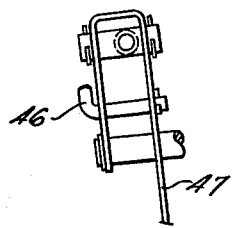
FIG. 5 is a fragmentary view as viewed from the direction of arrows V—V of FIG. 3.
Figure 4:
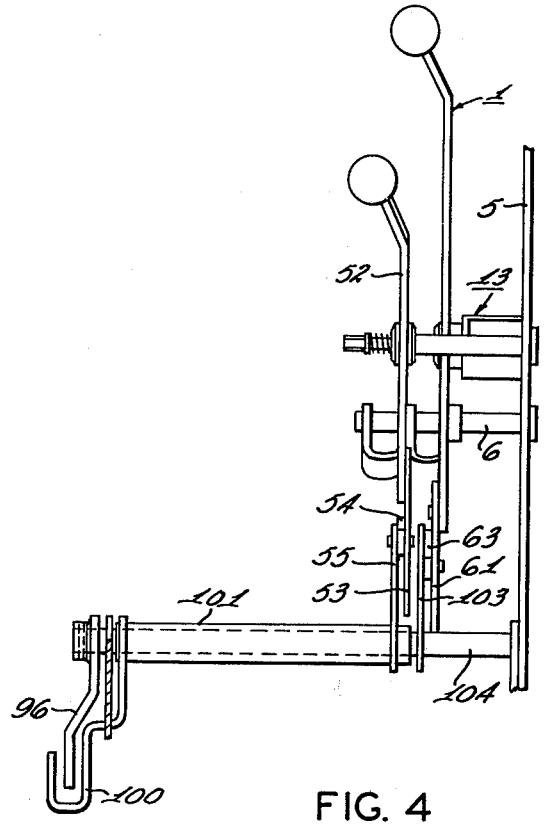
FIG. 4 is a fragmentary view as viewed from in the direction of the arrows IV—IV of FIG. 3.
Figure 6:
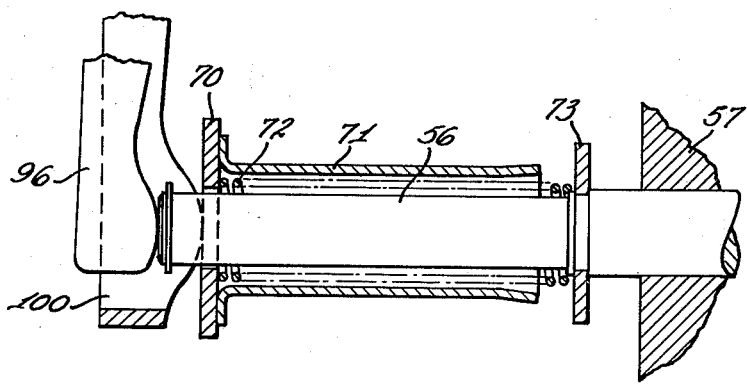
FIG. 6 is an enlarged view of a portion of the control valve spool.

Referring to FIG. 3, a draft vehicle 32 is shown. The drive shaft 33 is shown in section and is adapted for driving a rear wheel as indicated by numeral 34. The rear drive housing 35 supports a tortion bar sensing unit 36, which is connected to the lower draft arms 37 of which one is shown. The implement mast 38 is connected to the upper link 39, which in turn is connected to the bracket 40 on the rear drive housing 35. The sensing arm 41 is connected to the torsion bar draft load sensing unit 36. A sensing rod 42 is connected to the sensing arm 41. The sensing rod 42 is connected to the bell crank 43 which is pivotally supported on the rear drive housing 35. The bell crank 43 operates the control rod 44, which in turn is connected to the pivot arm 45. The arm 45 is connected through the adjustable link 46 pivotally supported on the feedback lever 47. The feedback lever 47 is connected through the position control rod 48 to the rock arms 49. The rock arms 49 are supported on the rock shaft 50, which is pivotally mounted in the rear drive housing. The rock arms 49 are connected to the lift links 51 to the lower draft arms 37.

The pivot arm 45 is also connected to the traction boost lever 52 through the link 53. A pushrod 54 is connected through the sensing lever 55, shaft 101, and lever 100 to operate the spool 56 in the sensing valve 57. This linkage provides the traction booster draft load control linkage which operates the sensing valve in response to draft load.

The position control includes the position control lever 1 operating through the link 61 which in turn is connected to the position pushrod 63 which connects through arm 103, shaft 104, and arm 96 to the position operating the spool 56. Positioning of the lever 1 operates to control the positioning of the spool 56 in the valve 57 by fixing the position of the implement 65.

The position control lever 1 provides a means of manually positioning the implement at a predetermined depth and maintaining this position manually. Once the lever 1 is set, the control valve will maintain the implement at this level. When the lever is moved to the lift position the valve will operate the hydraulic actuators and raise the implement to the transport position.

The draft load control arm 100 operates on the washer 70 and sleeves 71. The spring 72 is positioned between the washer 73 on spool 56. The spool 56 is spring biased against the arm 100 and arm 96.

There is also fluid pressure in a chamber of the valve when the valve is actuated and the force of the spring produces a reaction force on the spool 56. This reaction force is sufficient to move the position control lever 1 unless the lever is firmly held in position. Accordingly, the friction block on the lever permits its movement in one direction but the friction lock is sufficient to overcome the reaction force through the linkage from the spool 56. Reference may be had to U.S. Pat. No. 3,604,312 for a typical hydraulic valve of this type.

The operation of the device will be described in the following paragraphs.

The three-point hitch 92 provides a connection between the implement and the tractor. This linkage controls the position of the implement responsive to the draft load sensing mechanism and the position control mechanism. The draft load sensing mechanism has been illustrated merely to illustrate the general operation of the mechanism. We are primarily interested in a position control mechanism which provides a means for manually setting the position of the implement relative to the terrain on which it is operating. In other words when the position control mechanism is set and if the implement is for instance a plow the position control lever controls the height of the plow relative to the surface of the terrain.

The position control lever 1 is set to position and maintain the implement in its position. The lever 1 operates through the link 61, pushrod 63, and the position control arm 96 to maintain its predetermined position. During operation, however, there is the reaction force of the pressurized fluid in an actuating chamber and at a spring valve 57. If this force should become excessive the lever 60 may shift its position. This will not however happen under the circumstances as shown since the lever has a friction control to prevent shifting from this position.

Figure 2:
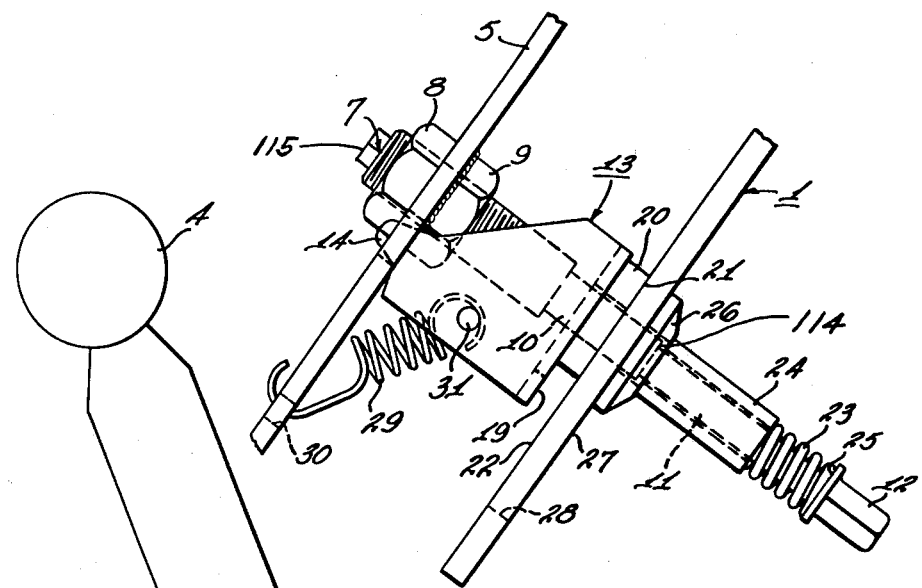
FIG. 2 illustrates a view taken as viewed from lines II—II of FIG. 1.

Referring to FIGS. 1 and 2, with the lever as shown the friction block 13 frictionally engages the surface 22 of the lever 1. The reaction plate 26 is biased to an engaging position by the spring 23 creating a force transmitted to the sleeve 24. These forces produce a frictional force preventing the lever 1 from moving in a counterclockwise direction as viewed in FIG. 1. The friction block operates as a self-energizing device since it wedges itself between the base plate 5 and the lever 1. The greater the force on lever 1 tending to rotate it in the counterclockwise direction the greater the wedging action of the friction block 13 and accordingly, this will prevent its movement in this direction.

The necessary force to move the lever is not so great but what it can be manually moved by the operator. Although the force required to move the lever in this direction is substantially greater than from moving in the opposite direction the operator has sufficient leverage on the lever to overcome the friction of the friction block to move it in this direction.

To move the lever in the clockwise direction the operator produces a force on the lever which tilts the block 13 and releases its frictional force. The block tilts in a counterclockwise direction as shown in FIG. 2 thereby exposing substantially no surface for engagement with the surface 22 on the lever 1. The surface 114 supports the sleeve 24 when the friction block 13 pivots counterclockwise thereby removing the spring load from the reaction plate 26 and allowing the lever 1 to move freely in the clockwise direction as viewed in FIG. 1. Surface 114 can be adjusted by loosening nut 8 and turning stud bolt 7 by means of the square end 115. Accordingly the lever can be readily moved by the operator to position desired.

The embodiments of the invention in which an exclusive property or priviledge is claimed are defined as follows:

1. A draft control system on a draft vehicle for controlling the height of an implement comprising, a draft vehicle, a draft control system on said draft vehicle including, a pivotal lever on said vehicle for positioning the height of the implement, support means on said vehicle pivotally supporting said lever and defining a pivotal axis, a friction control on said pivotal lever providing a friction lock in a first direction and a friction lock release in the second direction including, a friction block radially spaced from said axis and pivotally mounted on said support means, friction means on said friction block engaging said lever, resilient means on said support means and connected to said friction block biasing said friction means to an engaging position to retard movement of said lever in one direction and permit release of said friction means on said lever to permit said lever to pivot freely in the other direction.

2. In a draft control system on a draft vehicle for controlling the height of an implement as set forth in claim 1 including, a reaction plate mounted on said support means frictionally engaging said lever for receiving a reaction force from said friction block to retard movement of said lever in said one direction.

3. In a draft control system on a draft vehicle for controlling the height of an implement as set forth in claim 1 including a reaction plate supported on said support means, resilient means biasing said reaction plate against said lever to produce a reaction force from said friction block, means for adjustably controlling said resilient means to adjust the reaction force on said lever.

4. In a draft control system on a draft vehicle for controlling the height of an implement as set forth in claim 1 including means supporting a reaction plate for engaging said lever on the opposing side of said lever from said friction means, means supporting said friction block at a pivotal point on said supporting means radially spaced from said pivotal axis, said friction block positioning said friction means in spaced relation angularly from said pivotal point in the direction of force applied by said lever to thereby produce a diagonal reaction force in the direction of said force to cause self-energization of said friction block when said force is supplied.

5. In a draft control system on a draft vehicle for controlling the height of an implement as set forth in claim 1 including means supporting a reaction plate on the opposing side of said lever of said friction material on said friction block, means supporting said friction material on said friction block to engage said lever and produce a diagonal reaction force to the force of said lever to thereby provide a self-energizing brake means.

6. In a draft control system on a draft vehicle for controlling the height of an implement as set forth in claim 1 including means defining an arcuate slot in said lever, means supporting a reaction plate on said support means having supporting means extending through said arcuate slot to permit pivotal movement of said lever.

7. In a draft control system on a draft vehicle for controlling the height of an implement as set forth in claim 1 wherein said pivotal lever defines a position control lever.

8. In a draft control system on a draft vehicle for controlling the height of an implement as set forth in claim 1 including a position control lever and a draft load control lever in said system pivotally mounted on said vehicle, said pivotal lever defining said position control lever.

9. In a draft control system on a draft vehicle for controlling the height of an implement as set forth in claim 1 wherein said support means defines a control panel, said draft vehicle supporting said panel, said lever defines a position control lever on said draft vehicle.

10. In a draft control system on a draft vehicle for controlling the height of an implement as set forth in claim 1 including a hydraulic valve, a draft load sensing mechanism connected between the hydraulic valve and said pivotal lever.

* * * * *